United States Patent [19]

Savovic et al.

[11] Patent Number: 5,149,602
[45] Date of Patent: Sep. 22, 1992

[54] SELF-CORRECTING CELL LOCATING COMPRESSIVE PAD

[75] Inventors: Niko M. Savovic, Sunrise; Adnan Aksoy, Boca Raton, both of Fla.

[73] Assignee: Motorola, Inc., Schaumburg, Ill.

[21] Appl. No.: 718,124

[22] Filed: Jun. 20, 1991

[51] Int. Cl.⁵ .............................................. H01M 2/10
[52] U.S. Cl. ................................. 429/96; 429/100
[58] Field of Search ............................ 429/96–100, 429/66, 123

[56] References Cited

U.S. PATENT DOCUMENTS

| | | | |
|---|---|---|---|
| 3,042,733 | 7/1962 | Toda et al. | 429/66 |
| 4,125,681 | 11/1978 | Sjogren | 429/99 |
| 4,161,568 | 7/1979 | Lund | 429/99 |
| 4,545,639 | 10/1985 | Holden | 339/256 R |
| 4,554,226 | 11/1985 | Simonton | 429/153 |
| 4,842,966 | 6/1989 | Omori et al. | 429/96 |
| 4,993,973 | 2/1991 | Selinko | 429/96 |

*Primary Examiner*—Anthony Skapars
*Attorney, Agent, or Firm*—Juliana Agon

[57] ABSTRACT

A battery housing assembly for receiving an energy source (10) comprises a chamber (20) for receiving the energy source (10). A retaining pad (40) having adhesive applied on opposed sides (42A-B) is adhesively attached in between the chamber (20) and the energy source (10) for applying a force (44) in a direction substantially opposite to an energy source displacement (43) which is parallel to the retaining pad (40).

9 Claims, 1 Drawing Sheet

SELF-CORRECTING CELL LOCATING COMPRESSIVE PAD

BACKGROUND OF THE INVENTION

This invention relates to compliant pads for electrical devices and more particularly to compliant pads capable of accommodating the movement of devices and of accommodating the plurality of devices exhibiting different sizes.

Portable electronic devices such as radios typically use an energy storage medium (battery) to derive power necessary for operation. A battery can comprise a single battery cell or a plurality of battery cells arranged in a stick fashion, end-to-end, for example. A contacting scheme is required to reliably connect the energy source with the external electronic circuitry in the electronic device during all modes of operation.

An example of a more demanding mode is when the electronic device such as a radio has been dropped. Any movement of the battery during the shock and vibration created by the impact of the drop that causes a loss of power (a physical battery connection is broken) will cause unpredictable device operation, or in a case of a device with volatile memory circuits, a total loss of the memory's contents. An important point which must be considered in the case of portable communications devices, such as radios, is that the mass of the battery is a majority of the total mass of the electronic device. This creates problems in the design of a system to effectively retain the battery in a constant position during operation in all possible orientations and modes.

Batteries are often cylindrically or rectangularly shaped and include positive and negative electrical contact surfaces at their opposed ends respectively. Consequently, the battery is generally located in a cylindrical chamber or a rectangular chamber formed within a battery housing. To contact a battery, present embodiments require that conductive contacts be placed at opposite ends of the cylindrical or rectangular chamber so as to electrically and mechanically contact the respective positive and negative battery terminal surfaces of the battery situated in the chamber. Using conventional spring contacting methods, a conductive spring that compresses when the battery is inserted is situated at one end of the chamber. The spring force exerted by the contact acts to retain the battery against an opposing contact which is typically located on the opposite end of the battery.

For the production of battery packs, where the cells are placed end-to-end, intercell connections such as welds are often used between cells to prevent the plurality of battery cells from being permanently dislocated or displaced due to a vibration or a drop of the electronic device. The intercell connections are necessary since typically the contact spring force of the spring contact at the end of the cell string is not high enough to overcome the high frictional forces required to eliminate the internal rattle of the cells during vibration or a drop.

However, the design objective for an optimal contacting scheme generally dictates that the number of contact interfaces should be minimized. Following this objective will give a design with improved reliability as compared with a design having more interfaces. For example, if the intercell connections are eliminated, improved reliability will result. In addition, manufacturing cycle time will be reduced with the eliminated step to spot weld battery cells together in a battery pack. Thus, what is needed is a means for reliably contacting an energy source used to power an electronic device during all modes of operation.

SUMMARY OF THE INVENTION

Accordingly the present invention provides an improved apparatus for reliably contacting an energy source without using intercell connections, such as welds or springs, etc.

Briefly, according to the invention, a battery housing assembly for receiving an energy source comprises a chamber for receiving the energy source. A retaining pad having adhesive applied on opposed sides is adhesively attached in between the chamber and the energy source for applying a force in a direction substantially opposite to an energy source displacement which is parallel to the retaining pad.

DESCRIPTION OF THE PREFERRED EMBODIMENT

Figure 1:
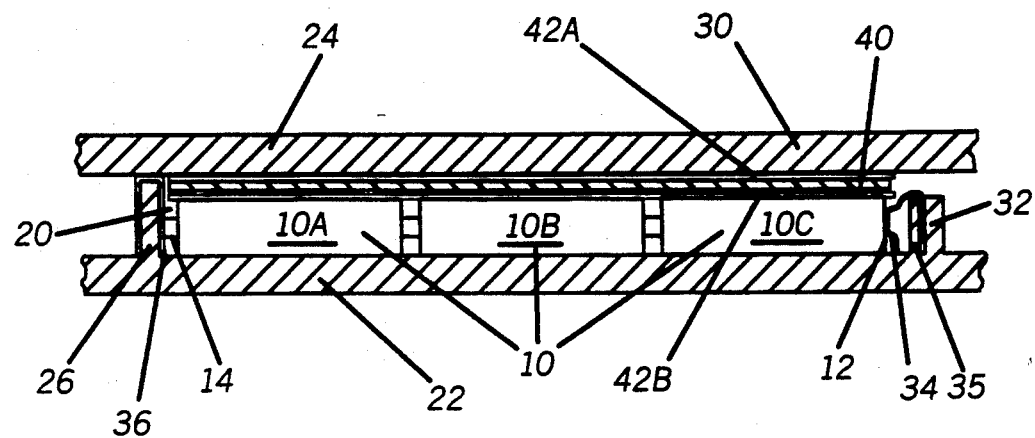
FIG. 1 is a representation of the self-correcting cell locating compressive pad of the present invention assembled in a battery housing.

FIG. 1 illustrates one embodiment of the self-correcting cell locating pad assembly of the present invention. Although, by way of example, the pad assembly of FIG. 1 is shown contacting an electrical battery device or energy source 10, those skilled in the art will appreciate that the pad assembly of FIG. 1 is also used to position other electrical devices. A battery can comprise a single battery cell or a plurality of battery cells 10A-C to form a battery pack arranged in a stick fashion (end-to-end) for example.

The battery or battery pack 10 is situated in a chamber 20 formed between sidewalls 22 and 24 of a battery housing 30. It is to be appreciated that the sidewall 22 may be a battery cover for the battery housing 30. The chamber 20 is shaped to accommodate the geometry of the battery to be situated therein, for example, rectangular or cylindrical. The battery housing 30 further includes top and bottom walls 26 and 32 which are situated so as to join sidewall 22 as shown in FIG. 1. Conventionally, the sidewalls 22 and 24 are eventually joined as by other top and bottom walls (not shown).

The end of the cell string or battery 10 includes an electrical contact surface or terminal 12 to which electrical connection is desired with external electrical components such as radio components. To form the electrical connection, the battery 10 is shown resting on a battery housing surface 34 to which a spring contact 35 is situated between the battery housing surface 34 and the bottom wall 32. In addition, a flat solid contact 36 is situated on the top wall 26 to achieve contact to a battery terminal 14 at the beginning of the cell string 10. Alternatively, spring contacts can be located at both ends of the cell string. Thus, in this embodiment, the spring contact 35 and the flat solid contact 36 provide the electrical connection between the ends of the outer most cells 10A and 10C arranged in a stick fashion and other external electrical components.

As can be seen in FIG. 1, there are no intercell connections such as spot welds between the battery cells 10A-C placed end-to-end with their terminals of one plurality contacting the terminals of an opposite plurality of the next cell. It is noted that in the view of FIG. 1, the portion of battery housing 30, facing the observer is cut away such that the observer may conveniently view the battery 10 and a self-locating pad or retaining means 40.

The compliant self-correcting cell locating pad 40 is made of a highly elastomeric material such as Poron ®, available from the Rogers Corporation, Poron and Composite Division, Box 158, E. Woodstock, Conn. 06244, neoprene foam, vinyl foam, urethane foam, silicone rubber, or any other suitable material providing a sufficient shear force to oppose a displacement force exerted on one side of the pad. In one exemplary application, the pad 40 is pressed, in parallel, between the sidewall 24 and/or 22 and the cells 10A-10C of the battery pack 10. Double sided adhesive 42A-B is applied on opposed sides of the pad 40 to provide a positive hold of both the cells 10A-10C and the housing 40 (either at one or both of the sidewalls 24 and 22). It is to be appreciated that the pad 40 may be located anywhere within the housing, such that one side of the pad is adhesively attached to the battery cells 10A-10C and the opposed side of the pad is attached to some part of the housing 30.

Figure 2:
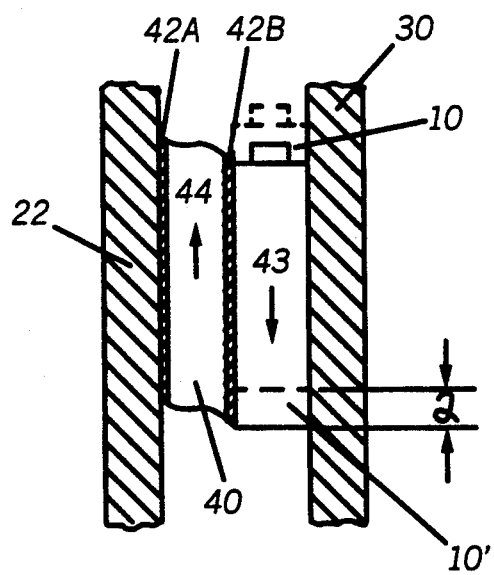
FIG. 2 is a representation of the pad of FIG. 1 shown in a shear mode.

Referring to FIG. 2, the elastomeric, compliant, or spring characteristics of the pad 40 used in a shear displacement mode allows the pad 40 to act as a self-correcting battery cell locater. Assuming the battery or cell 10 inside the battery housing 30 was dropped, the battery 10′ is shown in a momentary dislocated position away from the original position of the battery 10 (the desired or original position is represented by dashed lines) by a distance of ∂. Since the pad 40 is adhesively attached to both the battery housing cover 22 on one side (42A) of the pad 40 and to the battery on the opposed side (42B) of the pad, the downward shift 43 in cell location by the battery cell 10′ (as, for example, when the spring contact 35 of FIG. 1 is deflected) due to the momentary drop or vibration causes the pad 40 to be in shear displacement. The resultant shear force 44 exhibited by the pad 40 to the cell 10′ is in a direction of the desired cell compensating movement to cause the cell to move back to its original position (of the battery 10). The magnitude of the self-correcting force 44 is directly proportional to the displacement ∂ of the cell or cells. Therefore, the larger the amount of dislocation ∂ experienced by the cell 10′, the greater is the shear force exerted by the pad 40 to return the cell 10′ to its original position. Furthermore, the shear force 44 acts in addition to the contact spring force exerted by the spring contact 35 of FIG. 1 at the end of the cell string which typically is not high enough alone to overcome the high frictional forces required to eliminate internal rattle from a drop or vibration.

Another advantage to the pad assembly is that when the battery 10 varies in width, due to manufacturing tolerances from different manufacturers of the battery 10, the compliant pad 40 will serve to "take up" the variance and still insure a good electrical connection between the battery 10 and the contacts 35 and 36.

In summary, the use of the compliant pad's spring characteristics in a shear mode acts as a self-correcting battery cell locater. The use of the pad in this manner allows the production of energy products, such as battery packs using cells placed end-to-end, which require no intercell connections such as weld springs, yet still maintain electrical contact for product operation, such as for a radio.

We claim as our invention:

1. A battery housing assembly for receiving an energy source, comprising:
   a chamber for receiving said energy source; and
   retaining means having opposed sides adhesively attached in between said chamber and said energy source for applying a force in a direction substantially opposite to an energy source displacement parallel to said retaining means.

2. The battery housing assembly of claim 1 wherein said retaining means comprises an elastomeric pad having double-sided adhesive located in between said chamber and said energy source whereby the elastomeric characteristics of said pad compensates said energy source displacement.

3. The battery housing assembly of claim 2 wherein said elastomeric pad is made of neoprene foam.

4. The battery housing assembly of claim 1 wherein said retaining means comprises a compressive pad having double-sided adhesive located in between said chamber and said energy source to provide a positive means for retaining said energy source whereby the compressive force exerted by said chamber against said energy source is transformed into a shear force of said direction substantially opposite said energy source displacement.

5. The battery housing assembly of claim 1 wherein said energy source comprises a plurality of battery cells.

6. The battery housing assembly of claim 1 wherein said energy source comprises a plurality of battery cells connected end-to-end.

7. A method of compensating for displacement of an energy source, comprising the steps of:
   attaching a compressive pad having opposed adhesive sides between an inner wall of a battery chamber and said energy source; and
   compressing said adhesively attached compressive pad by biasing said energy source against said inner wall of said battery chamber with an opposed wall of said chamber thereby applying a force in a direction substantially opposite to an energy source displacement parallel to said walls.

8. The method of claim 7 further comprising the step of applying adhesive on opposed sides of said compressive pad to form said pad having opposed adhesive sides.

9. A radio battery housing assembly for receiving a plurality of battery cells, comprising:
   a plurality of battery cells for powering external electrical components of a radio;
   a chamber for receiving said plurality of battery cells; and
   retaining means having opposed sides adhesively attached in between said chamber and said plurality of battery cells for applying a force in a direction substantially opposite to a battery cell displacement parallel to said retaining means.

* * * * *